US010535099B2

(12) United States Patent
Kohnhorst et al.

(10) Patent No.: US 10,535,099 B2
(45) Date of Patent: Jan. 14, 2020

(54) FINANCIAL MARKET TRADING SYSTEM

(75) Inventors: Diederik Kohnhorst, London (GB); Steven Grigg, London (GB); David Alun Rowles, London (GB)

(73) Assignee: Refinitiv US Organization LLC, New York, NY (US)

( * ) Notice: Subject to any disclaimer, the term of this patent is extended or adjusted under 35 U.S.C. 154(b) by 1669 days.

(21) Appl. No.: 10/477,932

(22) PCT Filed: May 20, 2002

(86) PCT No.: PCT/GB02/02354
§ 371 (c)(1),
(2), (4) Date: Sep. 21, 2004

(87) PCT Pub. No.: WO02/095638
PCT Pub. Date: Nov. 28, 2002

(65) Prior Publication Data
US 2005/0049955 A1  Mar. 3, 2005

(30) Foreign Application Priority Data
May 18, 2001 (GB) .................................. 0112181.3

(51) Int. Cl.
*G06Q 40/04* (2012.01)
*H04L 12/46* (2006.01)
(52) U.S. Cl.
CPC ......... *G06Q 40/04* (2013.01); *H04L 12/4633* (2013.01); *G06Q 2220/10* (2013.01)

(58) Field of Classification Search
CPC .... G06Q 30/06; G06Q 40/04; G06Q 63/0485; G06Q 10/04; G06Q 40/24;
(Continued)

(56) References Cited

U.S. PATENT DOCUMENTS 4,388,489 A  6/1983 Wigan et al.
4,525,779 A  6/1985 Davids et al.
(Continued)

FOREIGN PATENT DOCUMENTS

EP  0434224 A  6/1991
GB  1489571  10/1977
(Continued)

*Primary Examiner* — Christine M Behncke
(74) *Attorney, Agent, or Firm* — Norton Rose Fulbright US LLP

(57) ABSTRACT

According to the present invention, there is provided a computer system for providing a centralized trading service to one or more trading party sites, the system comprising: a) a service data centre comprising: i) a trading computer arranged to process and communicate trading data and to generate trading ticket data in respect of confirmed trades on the basis of trading data: ii) a data store accessible to the trading computer for temporarily storing trading ticket data records; and b) one or more trading party sites each comprising at least one user terminal running a hypermedia browser application, each trading party site being located remotely from the data centre, and being arranged to communicate with the trading computer over a packet-switched communications network: the system being arranged to present, to users of the terminals, hypermedia user interface components comprising trading data received from the trading computer.

20 Claims, 14 Drawing Sheets

(58) Field of Classification Search
CPC . G06Q 2220/10; H04L 67/28; H04L 67/2861;
H04L 67/40; H04L 69/16; H04L 63/20;
H04L 63/02; H04L 29/06612; H04L
67/26; H04L 12/4633; H04W 36/08;
H04W 80/04; H04W 80/045; H04W
80/10; H04W 88/182; H04W 8/02; G06F
21/606; G06F 21/71; G06F 21/74; G06F
21/44–445
USPC .......... 705/26.1, 37, 412; 709/201; 370/338;
713/201; 719/201
See application file for complete search history.

(56) References Cited

U.S. PATENT DOCUMENTS

| | | | |
|---|---|---|---|
| 4,531,184 A | | 7/1985 | Wigan et al. |
| 4,555,781 A | | 11/1985 | Baldry et al. |
| 5,003,473 A | * | 3/1991 | Richards ................... 705/37 |
| 5,034,916 A | | 7/1991 | Ordish |
| 5,136,501 A | | 8/1992 | Silverman et al. |
| 5,195,031 A | * | 3/1993 | Ordish ............... G06Q 40/04 |
| | | | 705/37 |
| 5,727,165 A | * | 3/1998 | Ordish et al. ................ 70/7 |
| 5,819,238 A | * | 10/1998 | Fernholz ................... 705/36 R |
| 5,835,896 A | * | 11/1998 | Fisher et al. ............... 705/37 |
| 5,931,900 A | * | 8/1999 | Notani ............... G06Q 10/06 |
| | | | 709/201 |
| 5,974,135 A | * | 10/1999 | Breneman et al. ...... 379/265.04 |
| 6,041,357 A | * | 3/2000 | Kunzelman et al. ......... 709/228 |
| 6,061,796 A | * | 5/2000 | Chen et al. ................. 726/15 |
| 6,105,005 A | * | 8/2000 | Fuhrer ........................ 705/35 |
| 6,138,143 A | * | 10/2000 | Gigliotti et al. ............. 709/203 |
| 6,167,386 A | * | 12/2000 | Brown ........................ 705/37 |
| 6,223,343 B1 * | | 4/2001 | Hopwood et al. ............ 717/101 |
| 6,226,675 B1 * | | 5/2001 | Meltzer et al. ............... 709/223 |
| 6,289,462 B1 * | | 9/2001 | McNabb et al. ............... 726/21 |
| 6,336,119 B1 * | | 1/2002 | Banavar et al. ........... 707/104.1 |
| 6,345,305 B1 * | | 2/2002 | Beck et al. ................... 709/242 |
| 6,452,915 B1 * | | 9/2002 | Jorgensen ..................... 370/338 |
| 6,523,027 B1 * | | 2/2003 | Underwood ..................... 707/4 |
| 6,618,709 B1 * | | 9/2003 | Sneeringer ................... 705/412 |
| 6,850,907 B2 * | | 2/2005 | Lutnick et al. ................. 705/37 |
| 6,975,629 B2 * | | 12/2005 | Welin ........................... 370/392 |
| 7,269,793 B2 * | | 9/2007 | Horsfall et al. ............... 715/751 |
| 7,610,330 B1 * | | 10/2009 | Quinn et al. ................... 709/201 |
| 2001/0034689 A1 * | | 10/2001 | Heilman, Jr. .................... 705/37 |
| 2002/0002530 A1 | | 1/2002 | May |
| 2002/0066036 A1 * | | 5/2002 | Makineni et al. ............ 713/201 |
| 2002/0111818 A1 * | | 8/2002 | Morar et al. ...................... 705/1 |
| 2002/0111896 A1 * | | 8/2002 | Ben-Levy et al. ............. 705/37 |
| 2002/0143685 A1 | | 10/2002 | Horsfall et al. |
| 2003/0033415 A1 * | | 2/2003 | Graylin et al. ............... 709/229 |

FOREIGN PATENT DOCUMENTS

| | | | | |
|---|---|---|---|---|
| GB | 2139042 A | | 10/1984 | |
| GB | 2224141 A | | 4/1990 | |
| GB | 2377295 A | | 1/2003 | |
| WO | 0039719 | | 7/2000 | |
| WO | WO 00/39719 | | 7/2000 | |
| WO | 0055775 | | 9/2000 | |
| WO | WO 00/55775 | | 9/2000 | |
| WO | WO 00/72109 | * | 11/2000 | ............... G06F 1/00 |
| WO | WO 01/11521 A1 | * | 2/2001 | ............... G03H 1/04 |
| WO | 0188820 A2 | | 11/2001 | |

* cited by examiner

FINANCIAL MARKET TRADING SYSTEM

CROSS REFERENCE TO RELATED APPLICATIONS

This is a U.S. National Phase Application under 35 U.S.C. § 371 and Applicants herewith claim the benefit of priority of PCT/GB02/02354 filed May 20, 2002, which was published Under PCT Article 21(2), which claims priority to Great Britain Application No. 0112181.3, filed May 18, 2001, the entire contents of which are incorporated herein by reference.

TECHNICAL FIELD

The present invention relates to a communications and data processing system for trading financial instruments. More particularly, but not exclusively, the present invention relates to a communications and data processing system for trading financial instruments in which trades between parties may be negotiated or agreed by means of conversational data exchange between parties known to each other or as a result of computer-implemented matching of parties not known to each other.

BACKGROUND OF THE PRESENT INVENTION

In the major financial markets of today, trading of financial instruments is largely performed using communications and data processing systems. For example, in the Interbank foreign exchange market, products such as Reuters Dealing 3000 (which includes versions providing conversational and anonymous matching functions) are used by banks to trade currencies between themselves.

Conversational trading involves a party initiating contact with a known counter party and negotiating trading terms between the parties using a conversational communications capability such as text-based messaging. To enable creation of contracts and to avoid the crossing of offer, counter offer or acceptance messages, the conversational capability may be half-duplex in the sense that only one of the party or counter party is allowed to transmit a message at any one time. Trading using a matching capability involves parties unilaterally placing trading bids or offers or other trading requirements on a central database. Parties also generally maintain credit limits in respect of potential counter parties which are stored on a distributed database. Matching is performed independently of the parties and if a match between a party and counter party is identified, and if sufficient credit exists between the parties, the trade is executed automatically and the parties notified.

With conversational trading, it is essential for each party to maintain a record of all completed conversations, whether resulting in agreed trades or not, for evidential purposes. These conversational records may be used by the parties' back office computer systems for settlement and other purposes. Often, a summary of the terms of agreed trades is also maintained for future reference and for processing by back office systems of the parties. This summary is generally referred to as a trading or deal ticket and generally contains at least the information required to settle an agreed trade— for example, the name of the counter party, the financial instrument traded, the price and volume agreed and any other terms such as the type of instrument or settlement period. Optionally, there may be stored within a ticket a further record of the corresponding conversation. Although conversations do not occur with matched trading, data for the ticket and the confirmation of the trade still needs to be maintained by the parties as a record of the trade agreed. Reuters Dealing 3000 provides facilities for recording ticket data at client-sited data storage devices when a trade has been confirmed by the user. Furthermore, Dealing 3000 has a facility for automatically generating ticket data on the basis of conversational data exchange performed using the product.

FIG. 1 shows in simplified form the computer systems architecture used in the conversational features of Dealing 3000. Data processing devices for implementing the product are located at a client site 10. The client, for example, is a bank which trades on the Interbank foreign exchange market. At client site 10, traders use the product by operating a keystation 12 which implements business logic elements of the product and is a local client of dealing server 14 to which it is connected over a local area network (LAN) 16.

Keystation 12 comprises several components including a graphical user interface, a local service manager, local network communication components, and dealing business logic components which implement the main functionality of the product such as managing outgoing and incoming calls with other traders, and analysing conversation data to generate ticket data. Dealing server 14 comprises several components such as local area network communications components and a data store for storing conversational data and ticket data generated by keystation 12. Dealing server 14 also acts as an aggregator of keystations so that a plurality of keystations identical to keystation 12 may be connected over LAN 16 and may communicate over dealing network 20. Dealing server 14 also comprises a wide area network communication component for sending conversational data to Dealing network 20 via a dealing network access function 18 which acts as an aggregator of connections to dealing network 20 and will typically have a plurality of dealing servers from different client sites connected to it. Typically, there will be a plurality of dealing network access functions identical to dealing network access function 18 each connected to dealing network 20. The individual dealing servers connected to dealing network 20 are administered by an administration server 22. Thus, it can be seen that the business logic components and data store for storing conversational data and ticket data are wholly implemented at the client site. The client/server components implemented at client site 10 are proprietary to Reuters. For example, keystation 12 and dealing server 14 comprise proprietary applications for implementing the Dealing 3000 product. Keystation 12 may further comprise standard client applications such as a Web browser for accessing network resources over the internet, for example. However, this access is not enabled over local area network 16 or via dealing server 14, but rather over other conventional network access arrangements.

FIG. 1a shows in simplified form the computer systems architecture used in both the conversational and the matching features of Dealing 3000. Keystation 12, dealing server 14, LAN 16, dealing network access function 18, dealing network 20 and administration server 22 are as described above and provide the infrastructure for implementing a conversational dealing capability.

Keystation 13 and matching concentrator 15, both at client site 10, are also connected to LAN 16 which in turn is connected to central matching server 19 via several further matching concentrators 17 which are remote from client site 10. Matching concentrators 15 and 17 are part of an fan-like arrangement of matching concentrators such that central matching server 19 is connected to a plurality of level 0 matching concentrators which are in turn each connected to a plurality of level 1 matching concentrators and so on through a plurality of levels of matching concentrators until the connection to a client-sited matching concentrator is made. Thus, the fan-like architecture of matching concentrators provides communication capabilities between a plurality of keystations, such as keystation 13, and central matching server 19 whereby bids, offers and other trading requirements may be communicated by users of keystations to central matching server 19 which performs the matching service and may execute trades between parties in real time and notify the parties of the trade. Central matching server 19 is also connected to administration server 22 for administration purposes. Keystations 12 and 13 may be implemented in a single terminal device thus providing both conversational dealing and matching capabilities from a single terminal.

Various aspects of the Dealing 3000 product are shown in simplified form in FIGS. 1 and 1a. Previous dealing products as well as aspects of the dealing network operated by Reuters are described in detail in the Applicant's granted patents U.S. Pat. Nos. 4,388,489; 4,525,779; 4,531,184; 5,003,473; 5,034,916 and 5,195,031 which documents are incorporated herein by reference. For ease of understanding, some of the main technical aspects described in these documents are summarized below.

The documents describe a data communications network for conducting conversational video textual data communications—i.e. text typed at a keystation which may be displayed on a computer screen and sent over the network to be displayed on other computer screens. The system comprises a central message switching node connected to one or more terminal controllers at one or more subscriber premises via data communications links. Each terminal controller at subscriber premises may be connected to one or more keystations comprising a keyboard and a screen so that a trader may type in messages for sending to other traders at other subscribers premises and also receive messages from other traders. The conversation is locally stored at the subscriber premises by the terminal controller connected to the keystation and a hard copy of conversations may be printed out. Keystation screens may be split to display at least two different video conversations and also to display a conversation in one split screen and supplementary data retrieved from a database connected to the central message switching nodes of the central system.

Conversational text is sent in packets which may be less than the total displayable data content. Messages are addressed to particular keystations by unique identifiers and the central system has a packet switching network for routing received messages to the appropriate destination. The communication is half-duplex in that a keystation cannot both transmit and receive at the same time, but messages may be prepared prior to transmission while receiving a transmission from another party. Messages received by a keystation are displayed with the unique identifier of the sender as well as an optional interest message indicating the reason for the communication.

Additional functionality available at keystations includes i) the ability to create a contact list as well as an inhibit list to accelerate and screen contacts made throughout the network; ii) a "deal key" function that may be employed to immediately confirm receipt of a sent message on the screen of the sender; the use of a mouse and screen pointer used with a window display—by pointing to a contact and performing a single click an interest message is inserted into a command line ready for transmission, by double clicking, the interest message is automatically transmitted to the appropriate contact; iii) using a conversation analysing component connected to keystations to parse a trading conversation and automatically provide context-sensitive trading data messages in real-time—for example, the analysis may recognise the type of transaction occurring, and the details of the transaction; error messages may be provided highlighting inconsistencies in the data analysed; furthermore, tickets are created dynamically on the basis of the analysis.

U.S. Pat. No. 5,003,473 describes a communication system for transferring ticket data stored at a local database at a client site to a remote back office database thus back office records of tickets may be made without the back office computer continually polling the trading system.

The matching aspect of Reuters Dealing 3000 employ a similar computer systems architecture as has been described above in relation to the conversational aspect of Reuters Dealing 3000. The business logic components will of course implement matching capabilities rather than conversational trading capabilities and, likewise, data communicated from client site 10 over matching network 20 will be trading bids, offers or other requirements rather than conversational data. Furthermore, one or more central servers will be connected to a matching network 20 for implementing the anonymous matching process.

Various matching aspects of the Dealing 3000 Matching™ product, and previous matching products, are described in greater detail in granted U.S. Pat. No. 5,136,501 which is incorporated herein by reference.

In the Dealing 3000 product, other data may be sent to client site 10 over dealing network 20 such as real time data feeds of financial information and other news.

It is important to realize that in the prior art described above, the business logic components which process trading data, for example to automatically generate trading tickets for confirmed trades, are executed using dedicated computer systems of each trading party at a trading party site. One object of the present invention is to provide a centralised trading service which may be delivered from a central service data centre but which provides the functionality of the products described above, including the real-time conversational or matching trading facility and the automatic generation of trading tickets for confirmed trades.

International patent application publication no. WO 00/39719 and WO 00/55775 disclose computer-based matching systems for party and counterparty exchanges. Parties and counterparties may post their requirements with a central server over the Internet using a Web browser at a client terminal. The system enables consumers to obtain foreign exchange transactions directly with other consumers thereby cutting out the Interbank foreign exchange market. A trade can be identified which is at the mid-point of the Interbank bid/offer spread. The invention disclosed in these two documents cannot be used by the banks themselves to trade on the Interbank foreign exchange market. Furthermore the invention is not capable of providing a conversational trading facility or of generating or storing conversational trading data or trading ticket data.

SUMMARY OF THE PRESENT INVENTION

According to a first aspect of the present invention, there is provided a computer system for providing a centralized trading service to one or more trading party sites, the system comprising:

a) a service data centre comprising:
   i) a trading computer arranged to process and communicate trading data and to generate trading ticket data in respect of confirmed trades on the basis of trading data;
   ii) a data store accessible to the trading computer for temporarily storing trading ticket data records; and
b) one or more trading party sites each comprising at least one user terminal running a hypermedia browser application, each trading party site being located remotely from the data centre, and being arranged to communicate with the trading computer over a packet-switched communications network;
the system being arranged to present, to users of the terminals, hypermedia user interface components comprising trading data received from the trading computer.

Preferably, trading data for communication from the trading computer to a user terminal of one of the trading party sites is published using a publish and subscribe protocol to an information channel identifying the trading party site.

In one embodiment the trading party sites each comprise a trading ticket data receiving computer arranged to receive trading ticket data from the data store.

Preferably, trading ticket data for communication from the data store to the trading ticket data receiving computer of one of the trading party sites is published using a publish and subscribe protocol to an information channel identifying the trading party site.

Also preferably, the data store is arranged to delete trading ticket data records sent to the data record receiving computer upon confirmation of receipt.

According to a second aspect of the present invention, there is provided a method of providing a centralised trading service to one or more trading party sites, the method comprising the steps of:
   a) processing trading data at a trading computer of a service data centre;
   b) generating, at the trading computer, trading ticket data in respect of confirmed trades on the basis of the trading ticket data;
   c) temporarily storing generated trading ticket data at a data store of the service data centre;
   d) transmitting trading data over a packet-switched communications network to one or more trading party sites remote to the data centre, each trading party site comprising at least one user terminal running a hypermedia browser application; and
   e) presenting, to users of the terminals, hypermedia user interface components comprising trading data received from the trading computer.

According to a third aspect of the present invention, there is provided a service data centre for processing and communicating trading data for trading financial instruments, the data centre comprising:
   a) a trading computer arranged to process trading data and to generate trading ticket data in respect of confirmed trades on the basis of trading data;
   b) a hypermedia server arranged to communicate with the trading server, the hypermedia server comprising a hypermedia user interface generation component for generating hypermedia content for presenting trading data to a user; and
   c) a data store accessible to the trading server for temporarily storing trading ticket data records;
wherein the hypermedia server is arranged to publish trading data and trading ticket data, for communication from the trading computer to one of one or more trading party sites remote to the data centre, to an information channel identifying the trading party site using a publish and subscribe protocol.

According to a fourth aspect of the present invention, there is provided a trading party site for communicating and presenting trading data for trading financial instruments, the trading party site comprising:
   a) a computer for receiving trading data and trading ticket data from a remote service data centre; and
   b) at least one user terminal running a hypermedia browser application, the terminal being arranged to present to a user hypermedia user interface components comprising received trading data;
wherein the computer is arranged to subscribe to an information channel identifying the trading party site, to receive trading data and trading ticket data from the remote service data centre, using a publish and subscribe protocol.

Advantageously, the present invention allows for the business logic components for implementing the trading system to be located at a central server of a service provider remote from the user terminals of the service consumers and, thus, management of business logic components (such as handling upgrades, failures and so on) may be handled by the service provider at a central site without inconveniencing the service consumer.

A further or alternate advantage of the present invention is that commercially sensitive trading data and trading ticket data may be securely transferred to the appropriate service consumer for storage or processing. In particular, trading data and trading ticket data may be "pushed" to the appropriate service consumer outside the context of a client/server request-response transaction.

A further or alternate advantage of the present invention is that service consumers only require a lightweight data processing infrastructure and can mainly use standard commercial products to access the service.

According to a fifth aspect of the present invention, there is provided a system for communicating real-time conversational trading data for trading financial instruments, the system comprising
   a) a first user terminal associated with a trading party and comprising:
      i) a real-time conversational trading data communication component; and
      ii) a hypermedia user interface component for receiving from a user real-time conversational trading data for transmission to a user terminal associated with a counterparty using the conversational trading data communication component and for presenting to a user real-time conversational trading data received by the real-time conversational trading data communication component from the user terminal associated with the counterparty.
   b) a second user terminal associated with a trading counterparty and comprising:
      i) a real-time conversational trading data communication component; and
      ii) a hypermedia user interface component for receiving from a user real-time conversational trading data for transmission to a user terminal associated with a trading party using the conversational trading data communication component and for presenting to a user real-time conversational trading data received by the real-time conversational trading data communication component from the user terminal associated with the trading party; and c) a communications network connecting the first and second user terminals for communicating real-time conversational trading data.

According to a sixth aspect of the present invention, there is provided a method of communicating real-time conversational trading data for trading financial instruments, the method comprising the steps of:

a) communicating real-time conversational trading data between a user terminal associated with a trading party and a user terminal associated with a counterparty; and b) presenting, at one of the user terminals, a hypermedia user interface component comprising real-time conversational trading data received from the other user terminal or for transmission to the other user terminal.

According to a seventh aspect of the present invention, there is provided a user terminal associated with a trading party, the terminal being for communicating trading data for trading financial instruments, the user terminal comprising:

a) a trading data communication component for communicating trading data with a user terminal associated with a counterparty; and b) a hypermedia user interface component for presenting to a user graphical user interface elements received from a remote hypermedia server, the graphical user interface elements comprising trading data received by the trading data communication component;

wherein the trading data is communicated over a secure communications channel different the channel over which the graphical user interface elements are communicated.

Computer programs and other apparatus are also provided.

Further advantages will be apparent from the following description of the invention. There now follows, by way of example only, a detailed description of the present invention in which:

BRIEF DESCRIPTION OF DIAGRAMS

Figure 13:
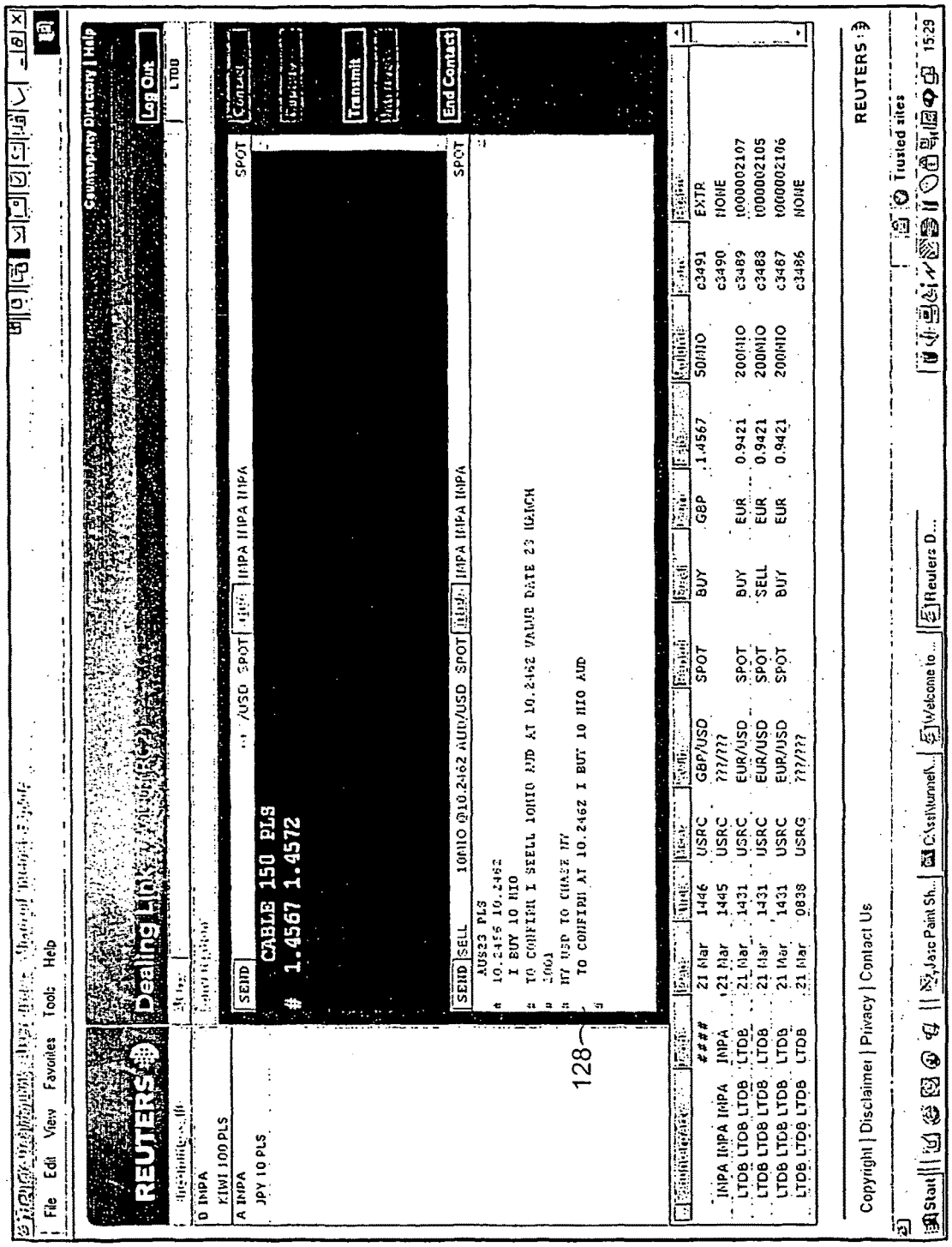
Figure 14:
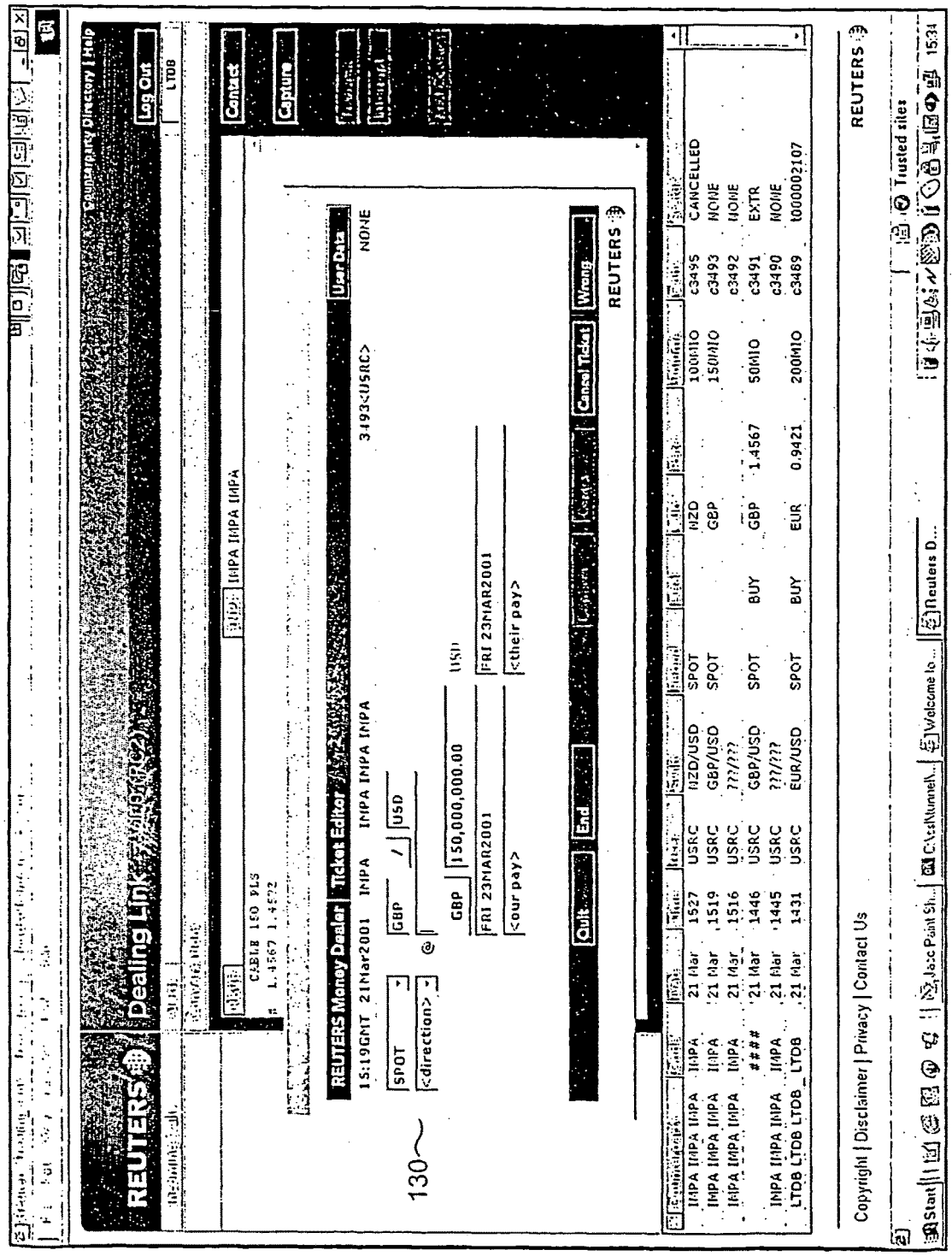

FIG. 13 is a screenshot of a Web page showing two conversation windows for displaying conversational data sent or received, one of which shows completion of a foreign exchange transaction, using a conversational trading system according to the present invention; and FIG. 14 is a screenshot of a Web page showing a ticket editor window displaying trading ticket data generated by a conversational trading system according to the present invention.

DETAILED DESCRIPTION OF THE PRESENT INVENTION

Figure 1:
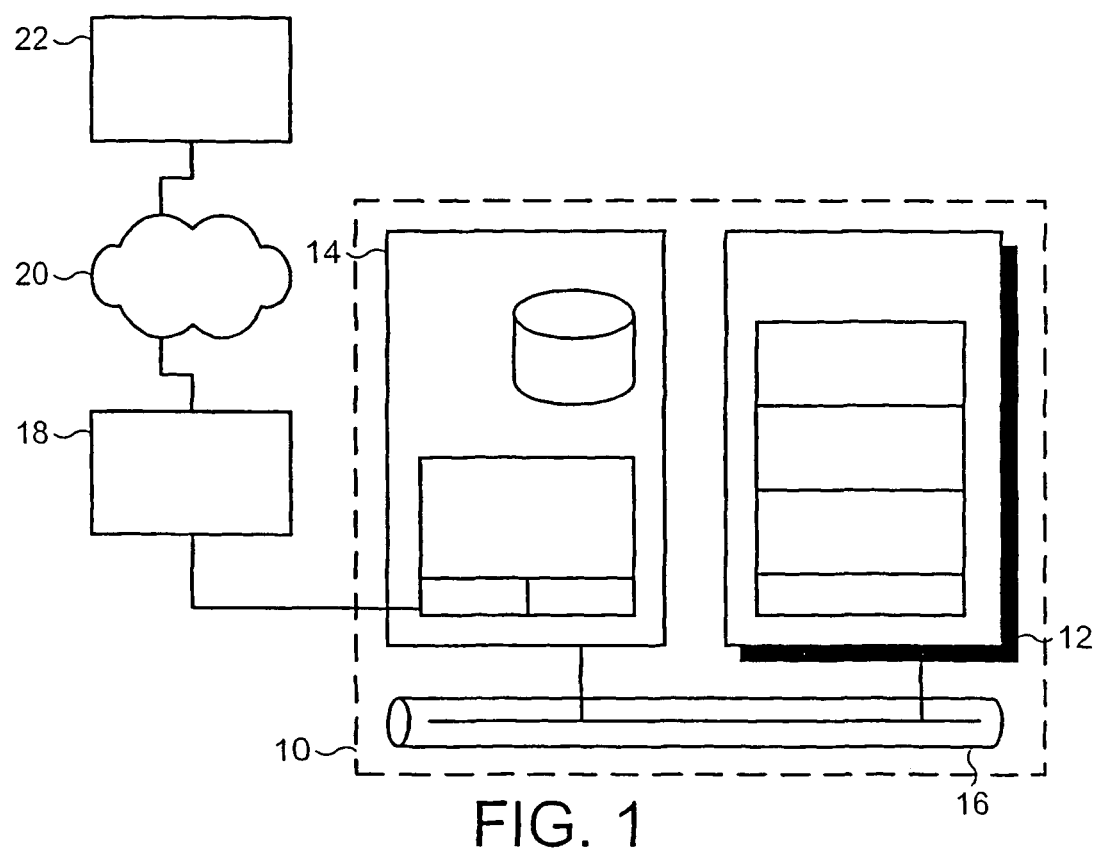
FIGS. 1 and 1a are schematic diagrams showing the computer systems and network architecture of financial trading systems according to the prior art.
Figure 1A:
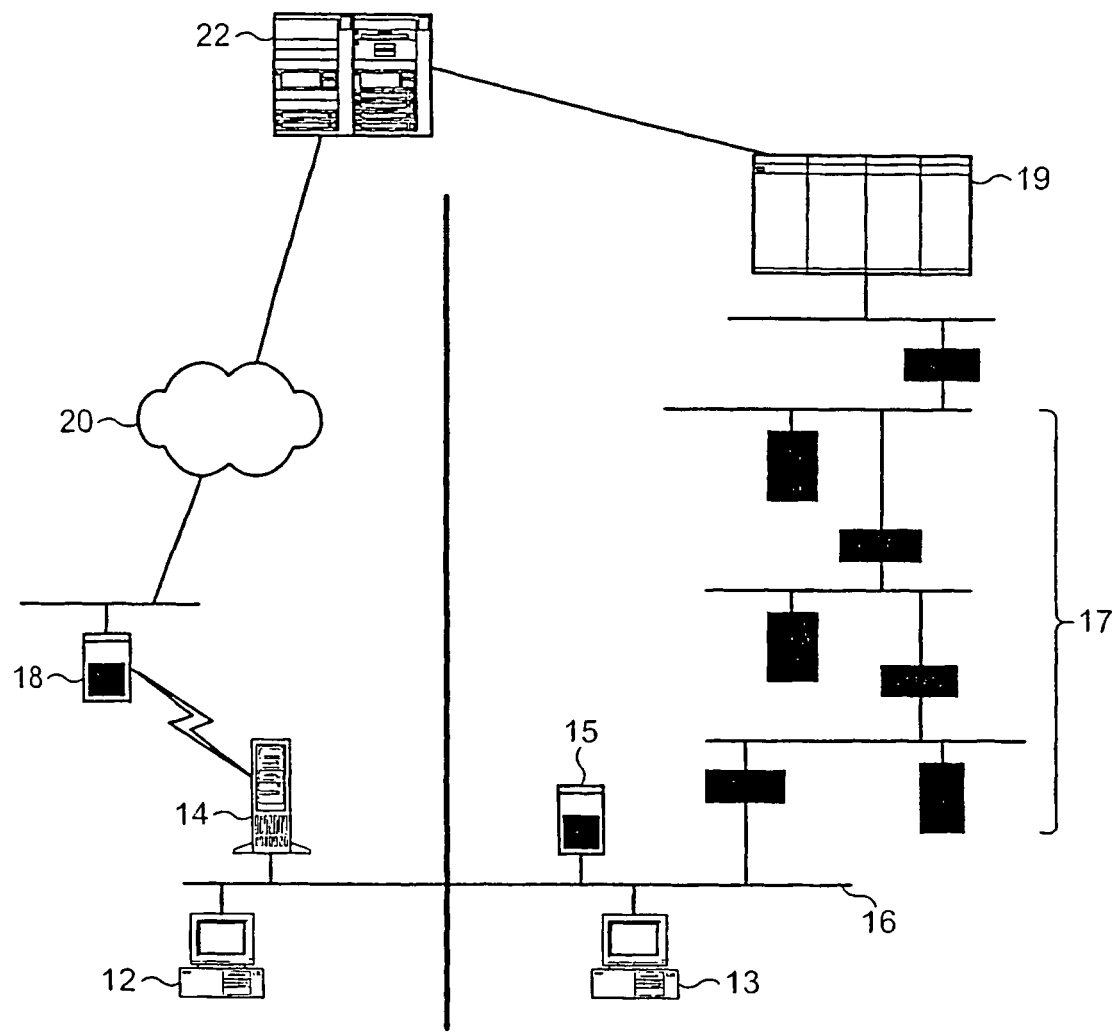

FIGS. 1 and 1a are schematic diagrams showing the computer systems and network architecture of financial trading systems according to the prior art, and have been described above.

Figure 2:
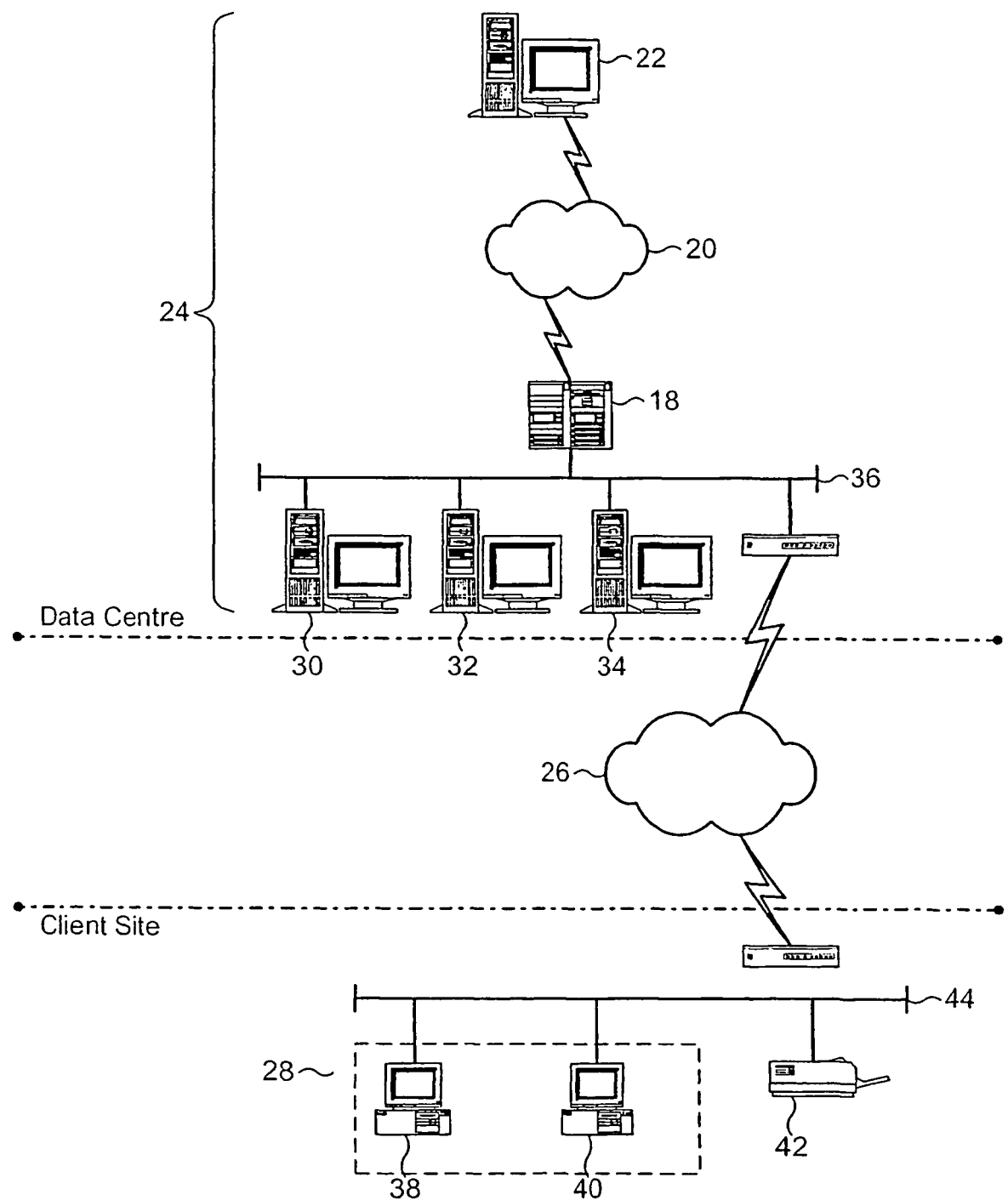
FIG. 2 is a schematic diagram showing in overview computer systems and network architecture suitable for implementing the present invention.

Embodiments of the present invention will now be described for implementing a conversational trading capability. However, it will be understood that the computer systems and network architecture described are also suitable for implementing a matching trading capability. FIG. 2 is a schematic diagram showing, computer systems and network architecture suitable for implementing the present invention. The architecture includes several known elements: dealing network 20, administration server 22 and dealing network access function 18. These are generally well known elements and have been described above in relation to the Reuters Dealing 3000 system of the prior art. However, the architecture includes several novel elements: a data centre 24 comprising a cluster of servers (a dealing server 30, a keystation server 32 and a hypermedia server 34 connected over a data centre LAN 36, all of which will be described in greater detail below), a communications network 26 and a client site 28 comprising a cluster of data processing devices (a keystation client 38, a client site server 40, and an optional client printer 42 each connected over a client site LAN 44, all of which will be described in greater detail below). Data centre cluster 24 is connected to dealing network 20 via dealing network access function 18. Data processing devices at data centre 24 may communicate with data processing devices at client site 28 over communications network 26 which may be any type of packet-switched or circuit-switched network. In preferred embodiments of the present invention, communications network 26 is a Internet Protocol (IP) network such as the public Internet or a private IP network such as a Radianz IP network.

Typically, there will be a plurality of client site clusters, such as client site cluster 28, connected to communications network 26 as well as a plurality of data centre clusters, such as data centre cluster 24, connected to communications network 26 and dealing network 20. Similarly, there will typically be a plurality of client site clusters 10, as described above in relation to FIG. 1 also connected to dealing network 20. Thus, it can be seen that a trader operating keystation client 38 of client site cluster 28 may be capable of communicating with another trader operating a keystation of a different client site cluster whether of the present invention or of the prior art systems such as Dealing 3000. It should also be noted that at client site cluster 28, a plurality of keystations, such as keystation 38, may be connected to the other client site components over client site LAN 44, thus a plurality of traders may operate personal keystations at one client site. The plurality of keystations may each communicate with client site server 40 over client site LAN 44, and with dealing server 30, keystation server 32, and hypermedia server 34 over dealing network 20 to provide the conversational dealing service to the users. In other words, data centre cluster 24 may provide service to a plurality of traders at client site cluster 28. Moreover, a plurality of keystations at different client site clusters may communicate with dealing server 30, keystation server 32, and hypermedia server 34 over dealing network 20 to provide the conversational dealing service to the users. Thus, data centre cluster 24 may provide service to a plurality of traders at different client sites.

It should also be noted that the functions or processes performed by any two, or all three, of dealing server 30, keystation server 32 and hypermedia server 34 may be implemented on a single physical server. Similarly, the functions or processes performed by keystation client 38 and client site server 40 may also be implemented on a single physical data processing device. However, for ease of explanation, embodiments will be described in which these functions or processes are performed by separate physical devices.

Figure 3:
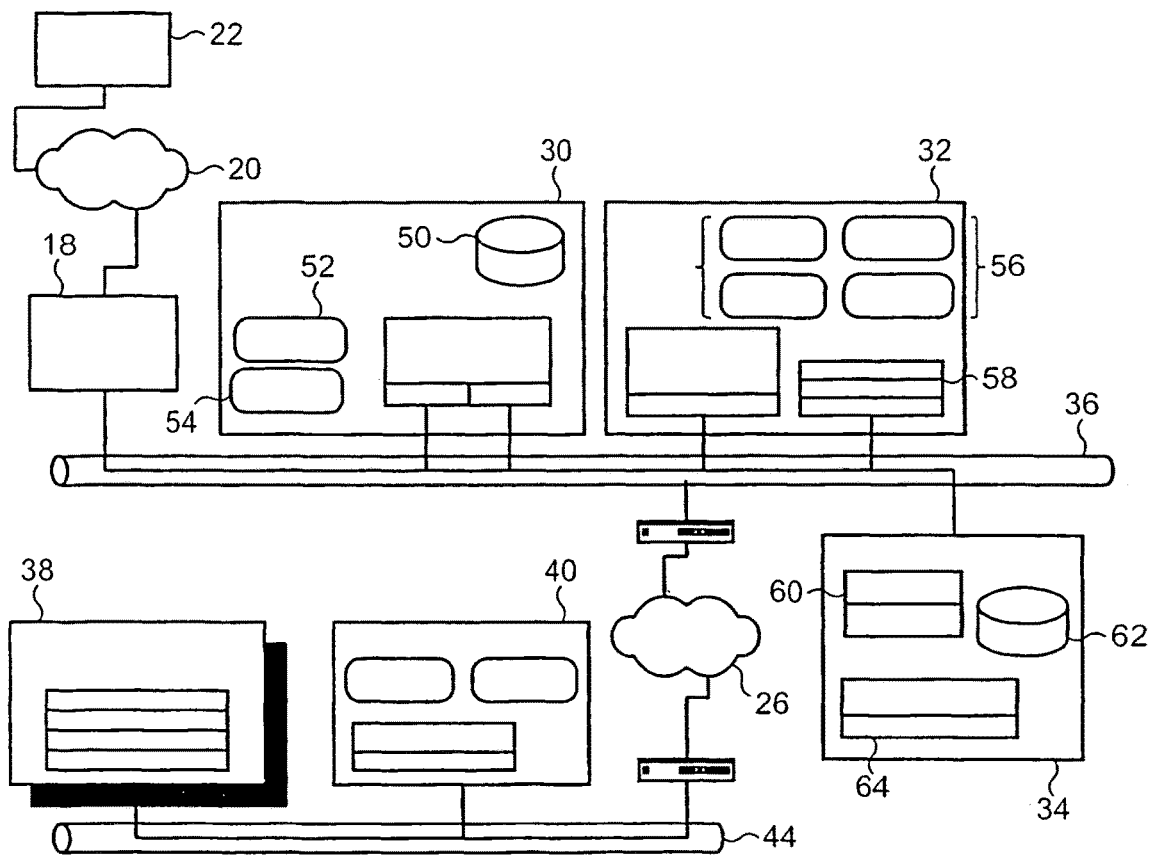
FIG. 3 is a schematic diagram showing in greater detail computer systems and network architecture located at a data centre for implementing the present invention.

FIG. 3 is a schematic diagram showing in greater detail computer systems and network architecture for implementing the present invention. Dealing server 30 is a personal computer (PC) running Microsoft™ Windows NT or Windows 2000 Professional with a Pentium or higher processor and at least 256 megabytes of RAM and 10 gigabytes of hard disk drive capacity after the operating system installation. Dealing server 30 comprises communication components for managing communication with the dealing network access function 18 and other data processing devices connected over data centre LAN 36. It also comprises a non-volatile data store 50 for storing conversational data and ticket data generated by keystation server 32. However, conversational data and trading ticket data are only stored temporarily at data store 50 until such time as they have been successfully communicated to client site server 40 over communication network 26.

In this respect, dealing server 30 further comprises a conversation and ticket forwarding component 52 which, together with a corresponding conversation and ticket forwarding component at client site server 40, is capable of managing the communication of conversational data and ticket data in an ASCII format over communications network 26 to the client site for storage and optional printing at client printer 42. Similarly, dealing server 30 comprises a ticket output feed forwarding component which, together with a corresponding ticket output feed forwarding component at client site server 40, is capable of managing the communication of ticket data over communications network 26 to the client site in a binary format suitable for storage and further processing by back-office systems at the client site.

Keystation server 32 is a PC with a specification similar to dealing server 30. Keystation server 32 comprises a local service manager and network communication component for communicating with other data processing devices over data centre LAN 36 as well as dealing business logic components 56 for implementing the main functionality of the trading system, such as managing incoming and outgoing calls using a call manager component, analysing conversational data to generate ticket data using an analysis component and other business logic functions. These business logic components are generally known from prior art systems such as Dealing 3000 and will not be described further. Unlike keystation 12 of the prior art, keystation server 32 does not comprise a graphical user interface or other user interface components for presenting information and receiving instruction from a user operating keystation server 32 via peripheral devices such as a screen keyboard and mouse. Instead, input and output data from the applications programming interface (API) of the dealing business components 56 are passed to communications component 58 which is capable of transmitting output data and receiving input data with keystation client 38 located at the client site over communications network 26.

It should be noted that real-time conversational dialogue data, conversational record data, trading ticket data, ticket output feed data from dealing server 30 as well as other data input or output from dealing business logic components 56 are not passed directly over communications network 26, but are sent over a secure encrypted tunnel established between hypermedia server 34 and client site server 40 via data centre LAN 36 and client site LAN 44 respectively. This will be described in greater detail below.

Hypermedia server 34 is a PC with a similar specification to dealing server 30 and runs a hypermedia server application such as Microsoft Internet Information Server™. Hypermedia server 34 comprises items of hypermedia content 60 which are communicated over communications network 26 to keystation client 38 at the client site and constitute the graphical user interface components presented to a trader operating keystation client 38 at the client site. Hypermedia content 60 comprises both static hypermedia content such as Web pages and active hypermedia content, such as Active-X™ controls, or links thereto. Hypermedia server 34 further comprises a configuration database 62 for storing administration records which are used to ensure that keystation client 38 is authenticated and authorised for access. Furthermore, hypermedia server 34 comprises communication component 64 for sending or receiving data over data centre LAN 36 and for sending or receiving over communications network 26 to client site server 40 using a secure encrypted tunnel.

Data centre LAN 36 is a conventional Ethernet LAN. Data centre LAN 36 will typically have a firewall in place between itself and communications network 26. In alternative embodiments of the present invention, further firewalls may be present such as between hypermedia server 34 and data centre LAN 36 and between dealing network access function 18 and data centre LAN 36.

It is to be understood that a plurality of keystation servers, such as keystation server 32, may be present at data centre 24 for providing a trading service to one or more keystations of one or more client sites. The plurality of keystation servers may be connected to one dealing server, such as dealing server 30, which acts as an aggregator allowing a plurality of keystation servers to have access to dealing network 20 over dealing network access function 18, or to a plurality of dealing servers, such as dealing server 30.

Similarly, there may be a plurality of hypermedia servers, such as hypermedia server 34, present at data centre 24. Also, data centre LAN 36 may be connected to a plurality of dealing network access functions identical to dealing network access function 18. Thus, load sharing and resilience capabilities may be implemented at data centre 24 in the event of failure of any one component.

Furthermore, as mentioned above, there will typically be a plurality of data centres, comprising the data processing devices described above, each connected to dealing network 20 via one or more dealing network access functions and also each connected to communications network 26. Again, this provides load sharing and resilience capabilities in the event of a data centre failure.

Figure 4:
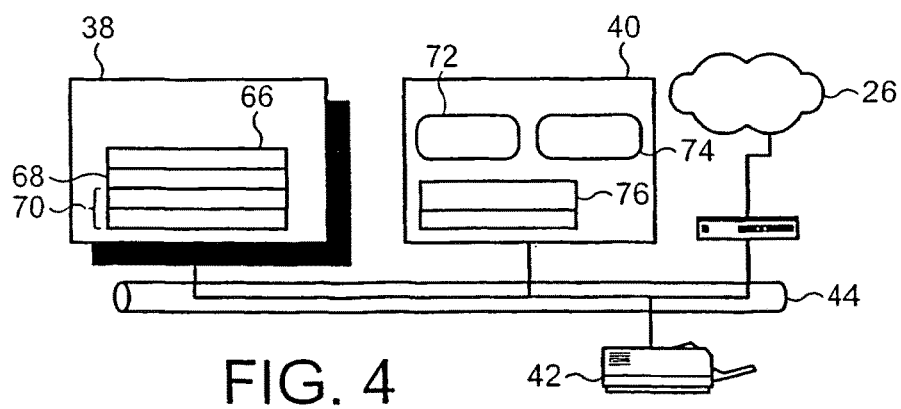
FIG. 4 is a schematic diagram showing in greater detail computer systems and network architecture located at a client site for implementing the present invention.

FIG. 4 is a schematic diagram showing in greater detail computer systems and network architecture located at a client site for implementing the present invention. Keystation client 38 is a PC with a specification similar to dealing server 30. Keystation client 38 comprises a hypermedia client 66. For example, this may be a Web browser such as Microsoft Internet Explorer™. Keystation client 38 also comprises hypermedia content 68 which may constitute static Web pages and active components such as Active-X™ controls or Visual Basic™ run-time modules. These active components may be downloaded from hypermedia server 34 or, alternatively, installed at keystation client 38. Keystation client 38 further comprises communications module 70 capable of communicating over client site LAN 44 and thus over communications network 26. A trader operating keystation client 38 points the hypermedia browser at the IP address or domain name corresponding to hypermedia server 34 in order to access the dealing service. Communication of hypermedia content constituting the user interfaces for presentation to a trader operating keystation client 38 and communication of actual conversational data, ticket data and other trading-related data are dealt with separately and will be described in detail below.

Client site server 40 comprises a conversation and forwarded ticket forwarding receiver component 72, which in combination with conversation and ticket forwarding component 52 of dealing server 30 at data centre 24, manages the communication of conversational data and ticket data in an ASCII format for storage and optional printing at client printer 42. Similarly, forwarded ticket output receiving feed remoting component 74, in combination with ticket output forwarding component 54 of dealing server 30, manages the communication of ticket output data in a binary format suitable for storage at the client site and for processing by back office systems located at the client site. Client site server 40 also comprises a communications component 76 for sending or receiving data over client site LAN 44 and sending or receiving data over communications network 26 hypermedia server 34 using a secure encrypted tunnel.

Client site LAN 44 is a conventional Ethernet LAN. Client site LAN 44 will typically have a firewall in place between itself and communications network 26.

Figure 5:
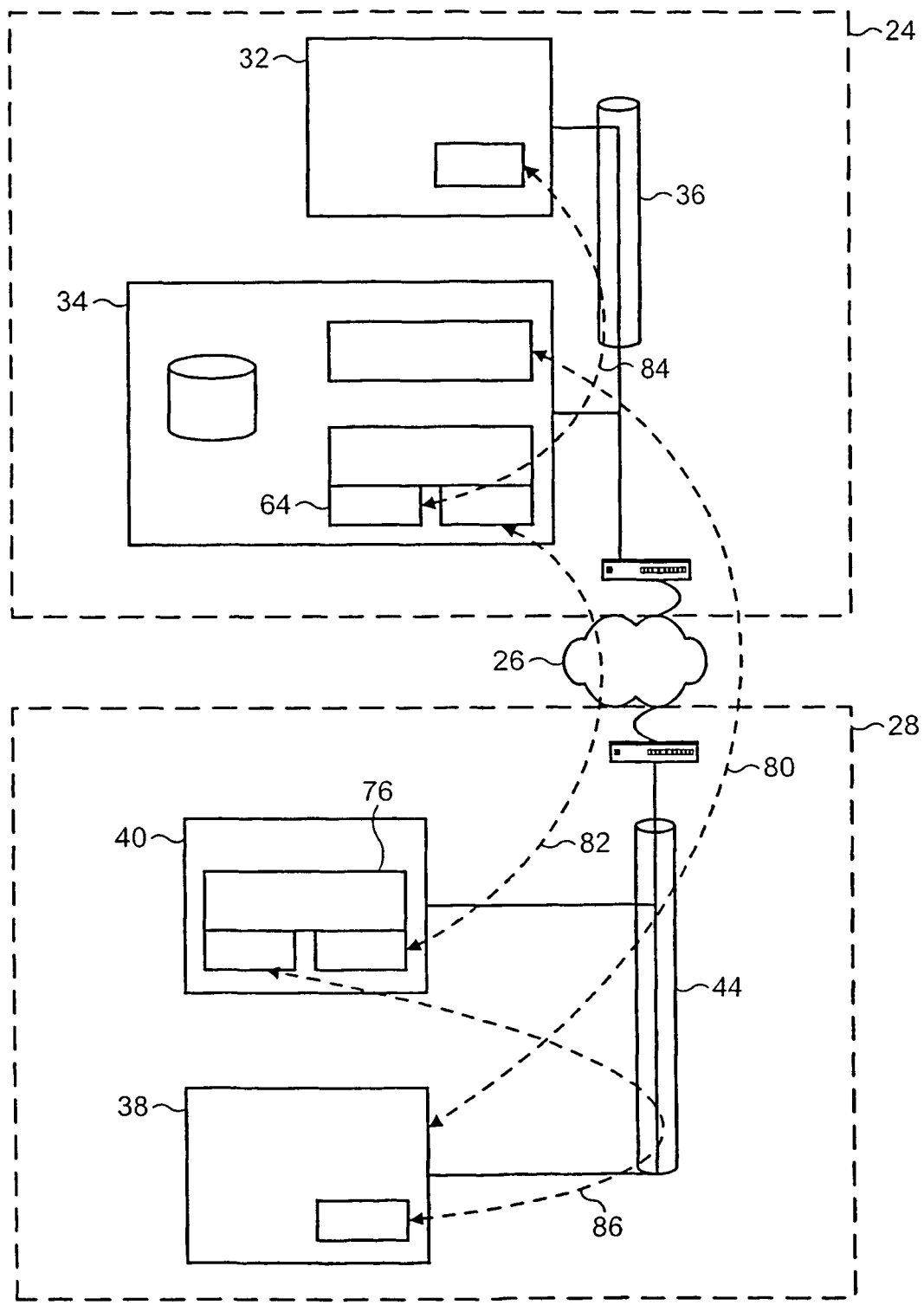
FIG. 5 shows data traffic occurring between various data processing devices of the present invention during use.

FIG. 5 shows data traffic occurring between various data processing devices of the present invention during use. There are three main types of data traffic passing between data centre 24 and client site 28: 1) real-time trading-related data, such as incoming call indicators, outgoing call requests, actual conversational trading dialogue data, trading ticket data generated on agreement of a trade and so on, which are communicated between keystation server 32 and keystation client 38, 2) trading-related data records generated after agreement of a trade, such as conversational data and ticket data in ASCII format for storage and optional printing and ticket output feed data in a binary format for storage and for use in back-office systems at the client site, which are passed from dealing server 30 to client site server 40 and 3) user interface requests and responses 80 which do not comprise trading-related data and which are communicated between hypermedia server 34 and keystation client 38.

All trading-related data, whether of type 1) or 2), is sent over the a secure encrypted tunnel established between hypermedia server 34 and client site server 40. This tunnel uses the Secure Sockets Layer (SSL) protocol. Keystation server 32, and keystation client 38 use a publish and subscribe communication protocol such as Tibco Rendezvous™ to transfer real-time data. This data is passed to hypermedia server 34 and client-site server 40 to be tunneled through communications network 26. Thus, real-time trading-related data traffic passed between keystation server 32 and hypermedia server 34 constitutes publish and subscribe protocol traffic 84. Similarly, real-time trading-related data traffic passed between client site server 40 and keystation client 38 constitutes publish and subscribe protocol traffic 86. However, between hypermedia server 34 and client site server 40, real-time trading-related data passed using the publish and subscribe protocol constitutes encrypted tunnel traffic 82. Although only one SSL tunnel is used to send real-time trading-related data between keystation server 32 and keystation client 38, in embodiments where a plurality of keysations are present at the client site 28, keystation/user identifiers are used to identify data as originating from or being addressed to a particular keystation/user.

It will be appreciated that that there will normally be a plurality of client sites 28 each served by data centre 24. Thus, a plurality of SSL tunnels will be created between hypermedia server 34 and each of the plurality of client site servers, such as client site server 40. In some cases, for example where a client site has more than a predetermined maximum number of keystations, hypermedia server 34 will have more than one SSL tunnel link to the client site server. One problem with the provision of service by the data centre to a plurality of client sites is the distribution of data traffic to the correct client site server or over the correct tunnel. With user interface requests and response 80 (non trading-related data), described above, the client/server request is initiated by a client browser application at the client site using a Hypertext Transfer Protocol (HTTP) Get request. This uses Transmission Control Protocol over Internet Protocol (TCP/IP) to ensure that the response to the Get request is directed to the IP address of the requesting client browser application. Thus, the response is directed to the client site server of the appropriate client site of the plurality of client sites served by the central data centre. This is wholly conventional.

However, with real-time trading related data and trading-related data records which are incoming to a client site, such as incoming call indicators, conversational data from a counterparty, trading ticket data and so on, these are not sent in accordance with a client/server request-response transaction, but need to be pushed to the appropriate client site server over the correct tunnel. This is achieved using the publish and subscribe protocol. Each SSL tunnel is identified with a unique four letter code, such as "IMPA", and after establishment of the tunnel, the corresponding client site server subscribes to a channel identified by its unique four letter code. Real-time trading related data and trading-related data records which are intended for a particular client site server or tunnel are published to the channel and are thus directed to the appropriate client site server over the appropriate tunnel by means of the publish and subscribe communications protocol.

Temporary conversation and ticket files stored in data store 50 of dealing server 30 are sent to client site server 40 which provides a central point of receipt at the client site. This data traffic (not shown) also uses the publish and subscribe protocol and the tunnel established between hypermedia server 34 and client site server 40. Conversational data and ticket data in ASCII format for storage and optional printing is published by conversation and ticket forwarding component 52 of dealing server 30 and ticket output feed data for processing or storage by back office systems at the client site is published by ticket output feed forwarding component 54 of dealing server 30. Conversation and ticket forwarding component 52 and ticket output feed forwarding component 54 each use the communications channel identified by a unique four letter code, described above, which is established after the secure communication channel between hypermedia server 34 and client site server 40 has been established. Conversation and ticket receiving component 72 and ticket output feed receiving component 74 of client site server 40 subscribe to the published channels to receive the corresponding data.

When a user of keystation client 38 first accesses hypermedia server 34, hypermedia browser 66 of keystation client 38 must authenticate hypermedia server 34 and, likewise, hypermedia server 34 must check whether key station client 38 is authorised for access to the trading system service. This is achieved using digital certificates and configuration records stored in configuration database held on hypermedia server 34. Hypermedia browser 66 sends up a digital certificate upon first accessing hypermedia server 34 which is authorised by querying configuration database 66. Similarly, the digital certificate returned by hypermedia server 34 is checked by hypermedia browser 66 to authenticate hypermedia server 34. If mutual authorisation/authentication is successful, a secure communications channel is established between keystation client 38 and hypermedia server 34, using the secure hypertext transfer protocol (HTTPS) over SSL (however, this is a separate tunnel to the SSL tunnel established between hypermedia server 34 and client site server 40). Thereafter, data traffic 80 comprising user interface requests and responses, which is communicated between hypermedia server 34 and keystation client 38, is secure and encrypted.

Figure 6:
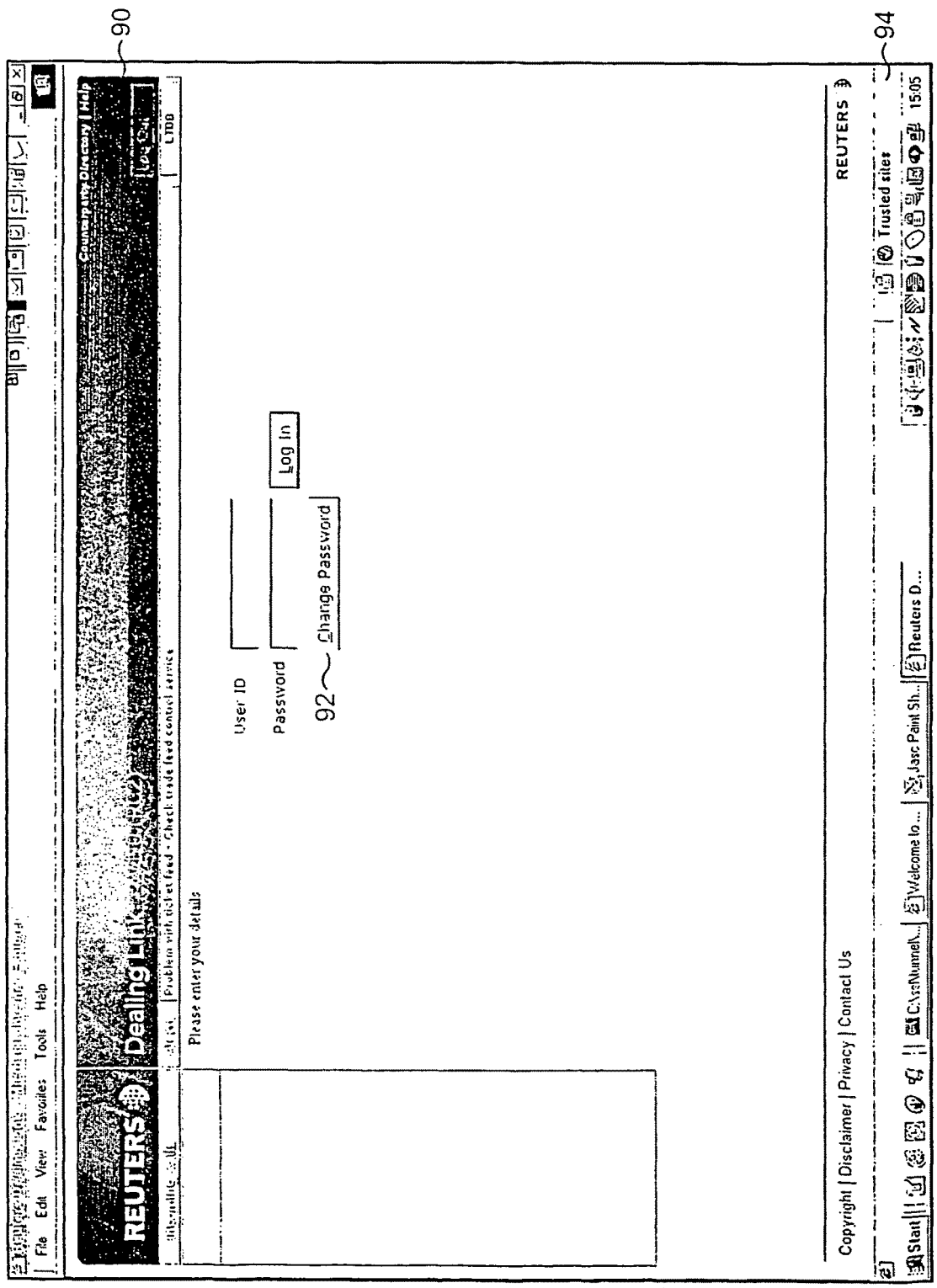
FIG. 6 is a screenshot of a Web page for user log in to a conversational trading system according to the present invention.

FIG. 6 is a screenshot of a Web page for user log in to a conversational trading system according to the present invention. Web page 90 is presented to a user of keystation client 38 on first pointing the hypermedia browser to hypermedia server 34. Web page 90 comprises user interface elements 92 for allowing a trader user to log in to the service by entering a user ID and password. Web page 90 also indicates that a secure encrypted tunnel has been established using HTTPS/SSL and that keystation client 38 has recognised the digital certificate of hypermedia server 34 by means of a status indicator 94.

Figure 7:
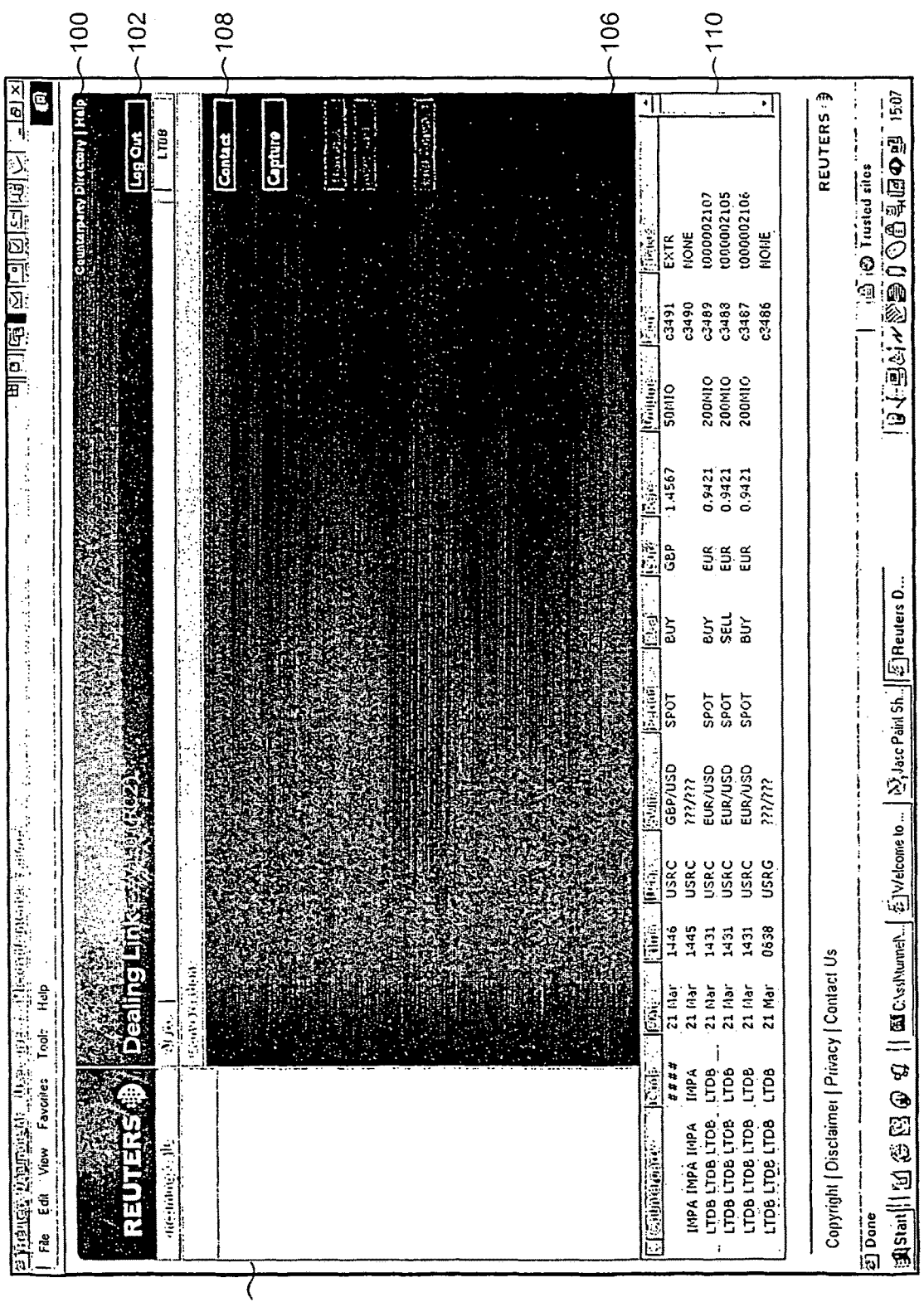
FIG. 7 is a screenshot of a Web page comprising the main screen of a conversational trading system according to the present invention.

FIG. 7 is a screenshot of a Web page comprising the main screen of a conversational trading system according to the present invention. After a trader user has logged in, a Web page such as Web page 100 is presented. Web page 100 comprises a push button 102 for logging out and a push button 108 for initiating a conversation with a counter party. Window 106 of Web page 100 is for displaying conversations with counterparties and is initially blank. Window 104 is for displaying incoming calls indicating that a counterparty wishes to enter into conversational communication with the trader user or with another trader user of the same trading party. Window 110 is for displaying a historical list of trades agreed by the trader user or other trader users of the same trading party and includes summary information such as may be found on a trading ticket for each agreed trade. Counterparties are identified by unique four letter codes such as "IMPA".

Figure 8:
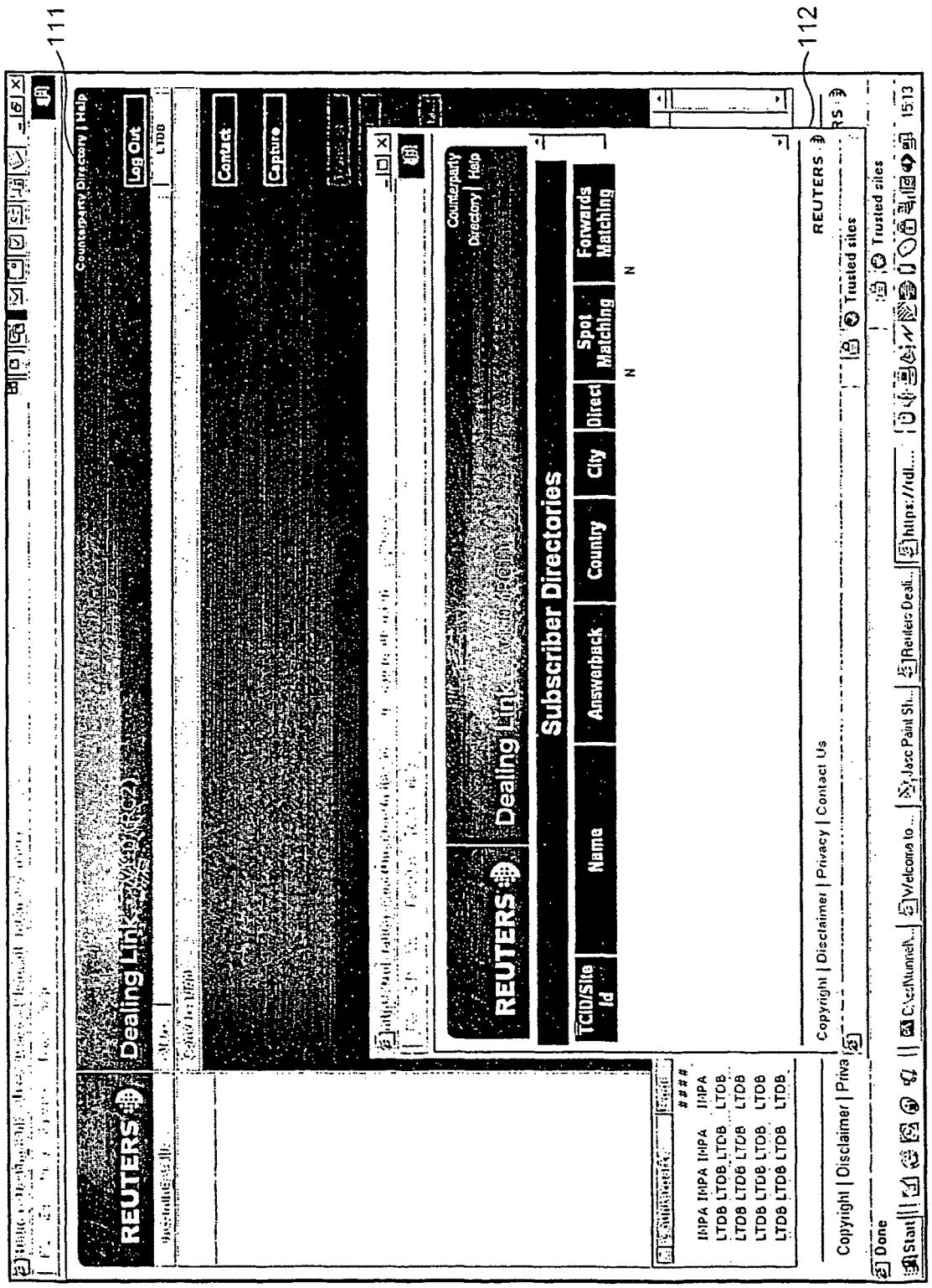
FIG. 8 is a screenshot of a Web page showing a directory list of potential counterparties for use in a conversational trading system according to the present invention.

FIG. 8 is a screenshot of a Web page showing a directory list of potential counterparties for use in a conversational trading system according to the present invention. Window 112 presents trading counterparties in a list including the unique four letter code, the counterparty name and various other information such as the counterparty's capability to enter into conversational trading ("Direct") or matching-based trading ("Spot or Forwards Matching"). Window 112 may be obtained by a user clicking on hyperlink 111 which contains an embedded Uniform Resource Locator (URL) pointing to Web content stored on hypermedia server 34.

Figure 9:
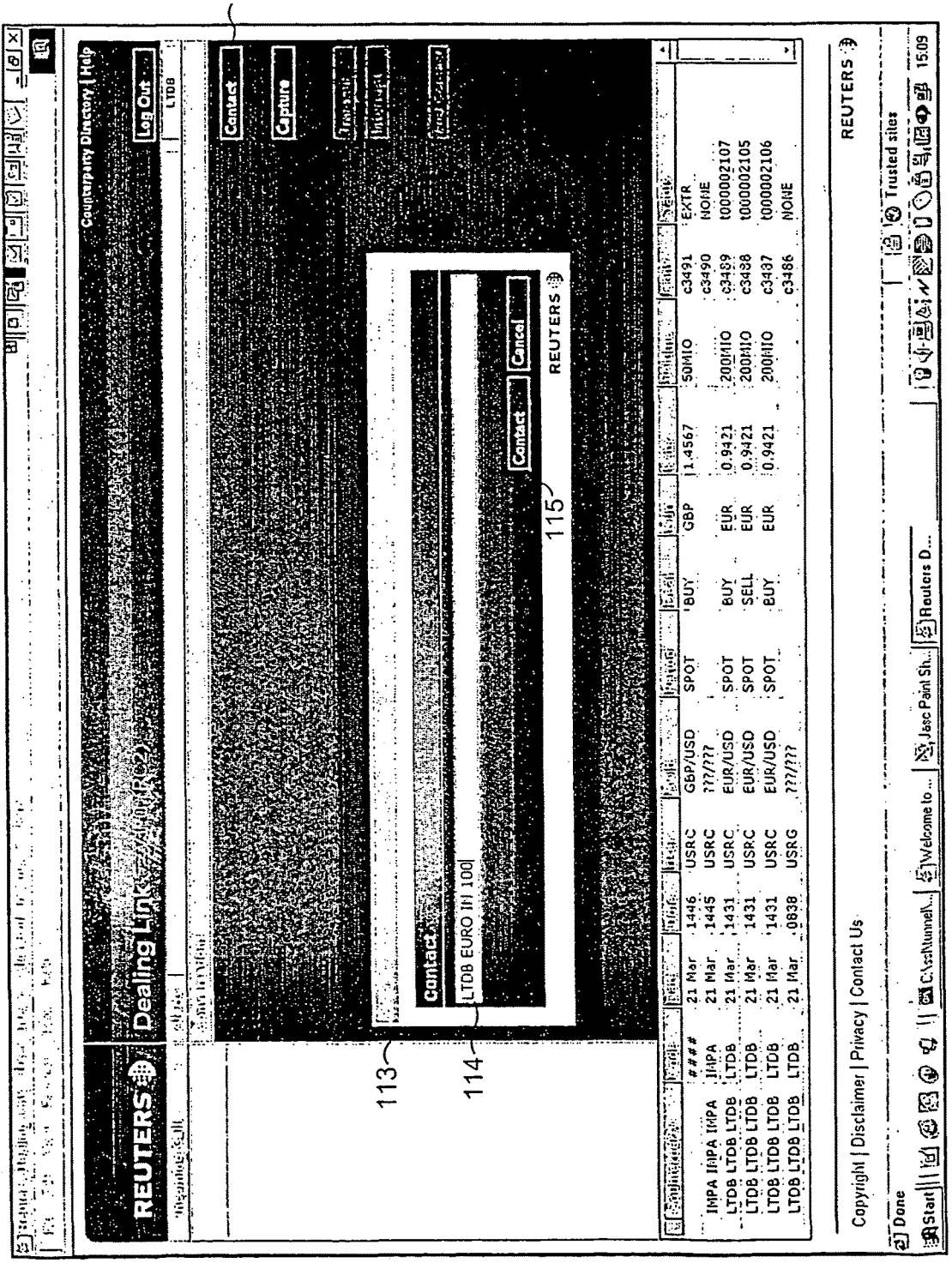
FIG. 9 is a screenshot showing a contact window for sending conversational data to a counterparty using a conversational trading system according to the present invention.

FIG. 9 is a screenshot showing a contact window for sending conversational data to a counterparty using a conversational trading system according to the present invention. By clicking on push button 108, the user is presented with contact window 113 which contains a text entry box 114 in which the user may type a trading counterparty identifier followed by optional conversational trading data such as an trading interest message. For example, the user has entered "LTDB EURO IN 100", indicating the counterparty "LTDB", and that he or she is interested in trading 100 million Euros. Window 113 also provides a push button 115 for sending the communication when complete. The conversational trading data "EURO IN 100" will then be sent from to the client site identified by "LTDB" and will appear in an incoming calls window of keystation clients at that client site.

Figure 10:
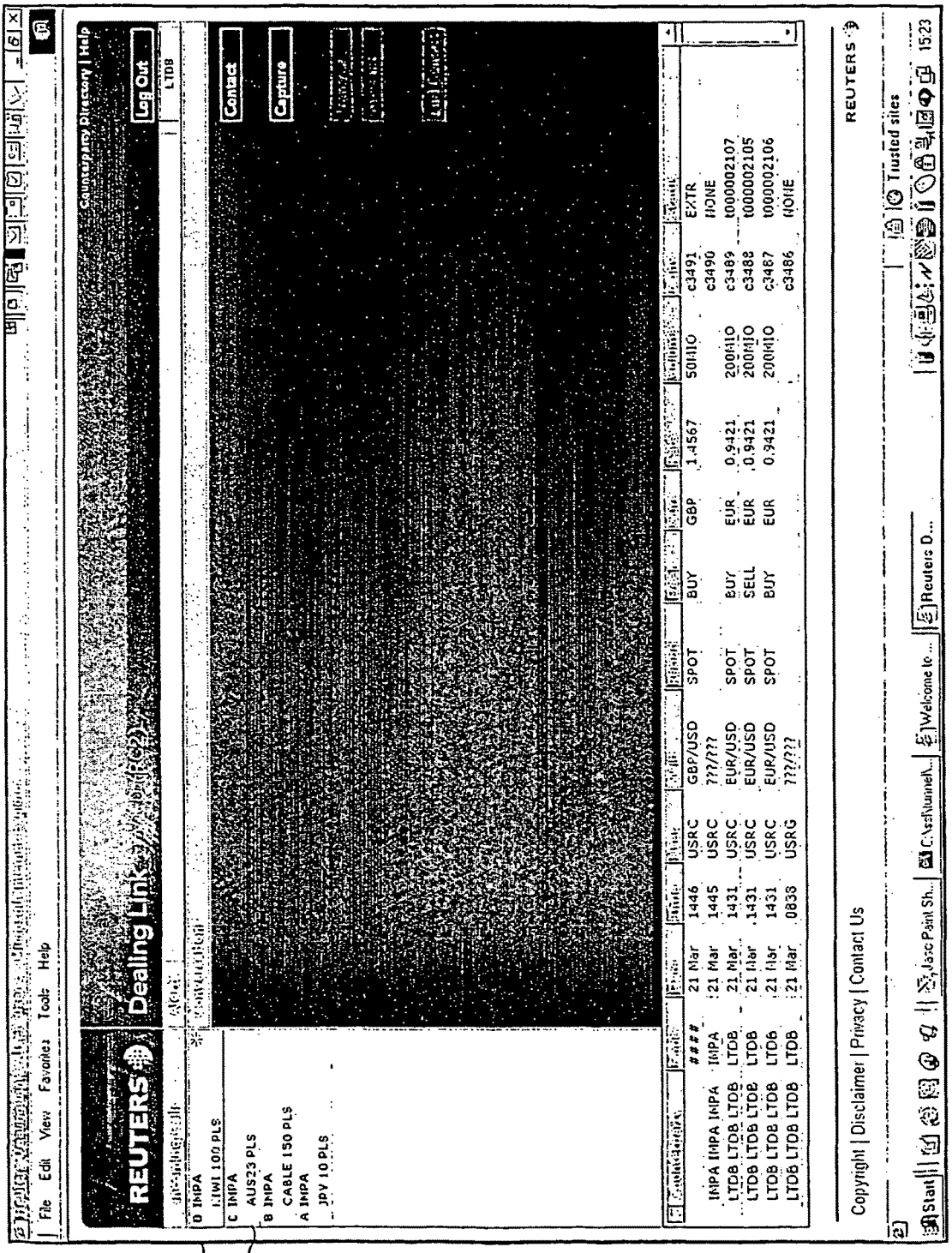
FIG. 10 is a screenshot showing the main Web page of FIG. 11 wherein incoming calls from a counterparty are displayed.

FIG. 10 is a screenshot showing the main Web page wherein incoming calls from a counterparty are displayed. When a counterparty has initiated a contact in a similar manner as has been described above, this is indicated in incoming calls window 104. For example, four incoming calls 116 are displayed in four boxes in order of receipt with letters of the alphabet as short references. The calls indicate the counterparty identifier, for example "IMPA", and the interest message, for example "KIWI 100 PLS" or "CABLE 150 PLS". The user may respond to an incoming call by clicking on the appropriate box or by typing the reference letter.

Figure 11:
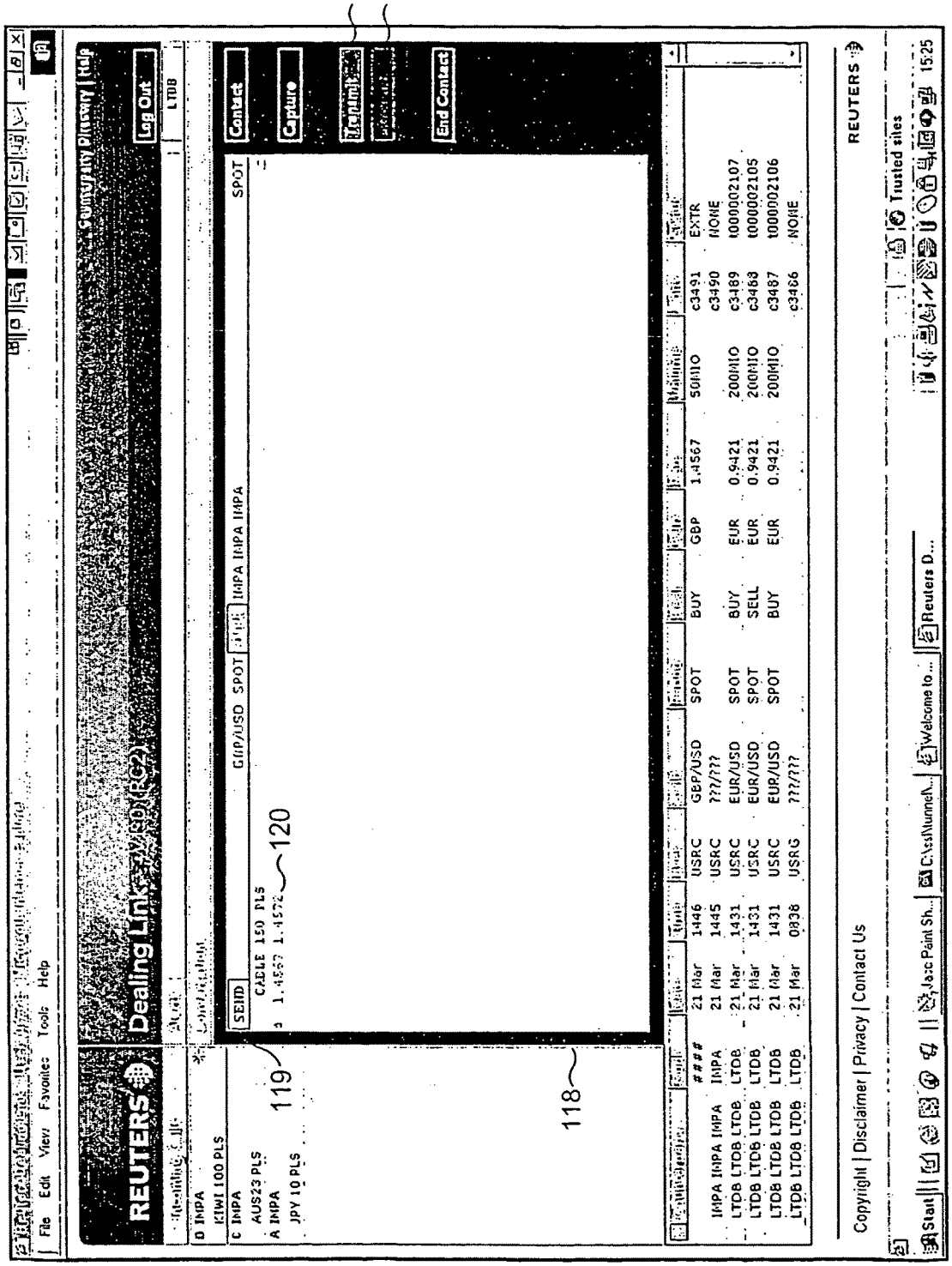
FIG. 11 is a screenshot of a Web page showing a single conversation window for displaying conversational data sent or received using a conversational trading system according to a present invention.

FIG. 11 is a screenshot of a Web page showing a single conversation window for displaying conversational data sent or received using a conversational trading system according to a present invention. On selecting the incoming call from "IMPA" referenced as letter "B" and displaying the interest message "CABLE 150 PLS", conversation window 118 is presented and contains the interest message as well as the counterparty identifier. Note that status indicator 119 indicates that the user has seized the conversation and is able to send a response (and correspondingly that the counterparty is not enabled to send any conversation data at that time). The user may then type a response to the interest message and send it by clicking on push button 121 labelled "Transmit".

Figure 12:
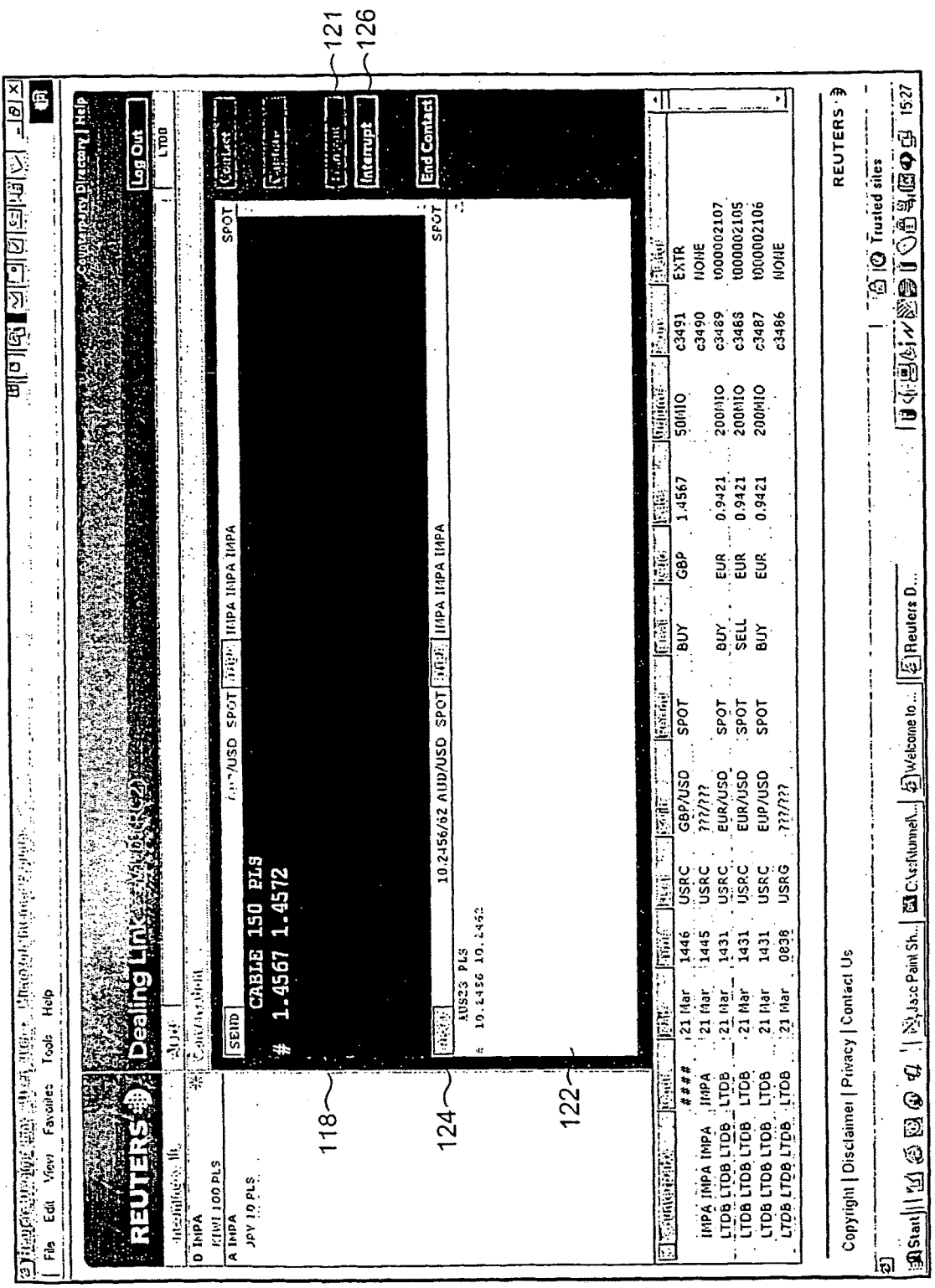
FIG. 12 is a screenshot showing a Web page with two conversation windows for displaying conversational data sent or received using a conversational trading system according to the present invention.

FIG. 12 is a screenshot showing a Web page with two conversation windows for displaying conversational data sent or received using a conversational trading system according to the present invention. Two conversation widows, 118 and 122, may be simultaneously displayed enabling a trader user to conduct two simultaneous conversations with the same or different trading counterparties. In FIG. 12, conversational window 122 is currently active and status indicator 124 shows that the counterparty has control of the conversation and that the user is unable to send any conversational data at that time. Note that push button 121 for transmitting conversational data is "grayed out" and the user cannot click on it. Push button 126 for interrupting the conversation is active however. This button allows the user to regain control of the conversation, thus regaining the ability to send conversational data and disabling the counterparty's ability to send conversational data. This may be useful, for example, where the user has made a mistake in his or her previous conversational message and wishes to avoid receiving a response to it, such as acceptance of what was a mistaken bid or offer to trade.

FIG. 13 is a screenshot of a Web page showing two conversation windows for displaying conversational data sent or received, one of which shows completion of a foreign exchange transaction, using a conversational trading system according to the present invention. Conversation window 128 shows the conversational dialogue between the trader user and a trading counterparty in which a trade has been agreed in which the counterparty will buy 10 million Australian dollars from the trading party at a price of 10.2463 (to the US dollar) on a spot trade basis (i.e. for settlement after two days).

FIG. 14 is a screenshot of a Web page showing a ticket editor window displaying trading ticket data generated by a conversational trading system according to the present invention. Ticket editor window 130 is presented by an Active-X component and is automatically generated and displayed upon the end of a conversation. Where the conversation analysis component on keystation server 32 has recognised a known type of trade, the fields in ticket editor window 130 are pre-filled with the recognised terms of the trade. In this example, the ticket information displayed is for a spot trade to sell 150 million British Pounds to the counterparty "IMPA" to be settled on 23 Mar. 2001. The ticket information may be immediately confirmed by the trader or first edited if incorrect. Once the ticket information has been confirmed, the ticket data and conversational trading data are temporarily stored by dealing server 30 until successfully transmitted to client site server 40.

While embodiments of the present invention have been described for implementing a conversational trading capability, it will be understood that the computer systems and network architecture described are also suitable for implementing a matching-based trading capability. Furthermore, while embodiments of the present invention have been described for trading financial instruments such as spot trades on the Interbank foreign exchange market, it is to be understood that the present invention may be used to trade any type of financial instrument in respect of any kind of asset, such as currencies, stocks, shares, bonds, commodities, derivatives and so on.

It is to be understood that the terms "computer", "server", "terminal", "data store", as well as cognate terms, denote either physical or logical instances of those entities. For instance, a computer, data store and server may be implemented as separate physical entities or as one physical entity performing logically separate functions. Similarly two servers may be implemented as separate physical entities or as one physical entity performing logically separate functions. Also, "terminal" will be understood to include mobile devices (e.g. mobile phones or PDAs) as well as stationary computers.

It will be understood that in embodiments of the invention, one or more parts of the system may be located in a different jurisdiction to the others. The invention extends to such embodiments.

For the avoidance of doubt, protection is hereby sought for any new matter or combinations thereof herein. The scope of the invention is not to be limited to the described embodiments or claims, but extends to variations and modifications thereof which retain the same inventive concept.

The invention claimed is:

1. A system comprising:
a first server configured to:
manage communication of conversational trading data that is intended for a client site, and is associated with dialogue between users at the client site and another client site,
generate trading ticket data, which is intended for the client site, for confirmed trades between the client site and the another client site based on an analysis of the conversational trading data, and
transmit, to a second server, first data that is formatted in a publish and subscribe protocol, is intended for the client site, and comprises the conversational trading data and the trading ticket data; and
the second server in communication with the first server, wherein the second server comprises memory storing executable instructions that, when executed, cause the second server to:
establish a first secure tunnel with a first encryption between the second server and a client site server that is in communication with one or more client stations, wherein the client site server and the one or more client stations are located at the client site,
associate an identifier for the first secure tunnel with the client site,
establish a second secure tunnel with a second encryption between the second server and a first station of the one or more client stations,
associate an identifier for the second secure tunnel with the client site,
receive the first data,
receive, from the client site, a request for user interface components,
determine second data that is formatted as a response to the request for the user interface components, is intended for the client site, and comprises the user interface components,
based on the identifier for the first secure tunnel being associated with the client site and responsive to a determination that the first data is intended for the client site and is formatted in the publish and subscribe protocol, transmit the first data to the client site via the first secure tunnel according to the first encryption, and
based on the identifier for the second secure tunnel being associated with the client site and responsive to a determination that the second data is intended for the client site and is formatted in the request and response protocol, transmit the second data to the client site via the second secure tunnel according to the second encryption.

2. The system of claim 1, wherein the transmitting the first data to the client site via the first secure tunnel comprises publishing, using the publish and subscribe protocol, to the first secure tunnel.

3. The system of claim 1, further comprising a data store configured to store temporary conversation and ticket files;

wherein the executable instructions, when executed, cause the second server to publish, using the publish and subscribe protocol, the temporary conversation and ticket files to the first secure tunnel.

4. The system of claim 3, wherein the data store is configured to delete the temporary conversation and ticket files after the temporary conversation and ticket files are published to the first secure tunnel.

5. The system of claim 1, wherein the first data comprises incoming call indicators and outgoing call requests associated with real-time trading between the client site and the another client site.

6. The system of claim 1, wherein the first secure tunnel is a Secure Sockets Layer (SSL) tunnel, wherein the identifier for the first secure tunnel is a four letter code unique to the first secure tunnel, wherein the publish and subscribe protocol is Tibco Rendezvous, and wherein the request and response protocol is secure hypertext transfer protocol (HTTPS).

7. The system of claim 1, wherein the user interface components comprise static hypermedia content and active hypermedia content for presentation at the first station.

8. A system according to claim 1, wherein the executable instructions, when executed, cause the second server to:
receive third data that is intended for the client site, is formatted in the publish and subscribe protocol, and comprises records generated by a dealing server after agreement of a trade;
based on the identifier for the first secure tunnel being associated with the client site and responsive to a determination that the third data is intended for the client site and is formatted in the publish and subscribe protocol, identify that the first secure tunnel is to transmit the third data; and
transmit the third data to the client site via the first secure tunnel according to the first encryption.

9. The system of claim 1, further comprising the client site server configured to:
subscribe to the first secure tunnel based on the identifier of the first secure tunnel.

10. A method comprising:
managing, by a first server, communication of conversational trading data that is intended for a client site, and is associated with dialogue between users at the client site and another client site;
generating, by the first server, trading ticket data, which is intended for the client site, for confirmed trades between the client site and the another client site based on an analysis of the conversational trading data;
transmitting, to a second server in communication with the first server, first data that is formatted in a publish and subscribe protocol, is intended for the client site, and comprises the conversational trading data and the trading ticket data;
transmitting, to the second server, second data that is formatted in a request and response protocol, is intended for the client site, and comprises user interface components;
establishing, by the second server, a first secure tunnel with a first encryption between the second server and a client site server that is in communication with one or more client stations, wherein the client site server and the one or more client stations are resident at the client site;
associating an identifier for the first secure tunnel with the client site;
establishing, by the second server, a second secure tunnel with a second encryption between the second server and a first station of the one or more client stations;
associating an identifier for the second secure tunnel with the client site;
based on the identifier for the first secure tunnel being associated with the client site and responsive to a determination that the first data is intended for the client site and is formatted in the publish and subscribe protocol, transmitting the first data via the first secure tunnel according to the first encryption; and
based on the identifier for the second secure tunnel being associated with the client site and responsive to a determination that the second data is intended for the client site and is formatted in the request and response protocol, transmitting the second data via the second secure tunnel according to the second encryption.

11. The method of claim 10, wherein transmitting, by the first server, the first data to the client site via the first secure tunnel further comprises publishing, by the second server, to the first secure tunnel using the publish and subscribe protocol.

12. The method of claim 10, further comprising publishing, by the second server, using the publish and subscribe protocol, temporary conversation and ticket files stored in a data store to the first secure tunnel.

13. The method of claim 12, wherein the data store is configured to delete the temporary conversation and ticket files after the temporary conversation and ticket files are published to the first secure tunnel.

14. A method according to claim 10, wherein the first data comprises incoming call indicators and outgoing call requests associated with real-time trading between the client site and the another client site.

15. A method according to claim 10, wherein the user interface components comprise static hypermedia content and active hypermedia content for presentation at the first station.

16. A system comprising:
a keystation server configured to:
manage communication of conversational trading data that is intended for a client site and is associated with dialogue between users at the client site and another client site,
generate trading ticket data, which is intended for the client site, for confirmed trades between the client site and the another client site based on an analysis of the conversational trading data, and
transmit, to a data store, first data that is formatted in a publish and subscribe protocol, is intended for the client site, and comprises the conversational trading data and the trading ticket data;
a data store accessible to the keystation server for temporarily storing the conversational trading data and the trading ticket data; and
a hypermedia server comprising memory storing executable instructions that, when executed, cause the hypermedia server to:
establish a first secure tunnel with a first encryption between the hypermedia server and a client site server that is in communication with one or more client stations, wherein the client site server and the one or more client stations are resident at the client site,
associate an identifier for the first secure tunnel with the client site, establish a second secure tunnel with a second encryption between the hypermedia server and a first station of the one or more client stations, associate an identifier for the second secure tunnel with the client site, receive a request, from the client site, for user interface components, receive user interface component data that is formatted in a request and response protocol, is intended for the client site, and comprises the user interface components;

based on the identifier for the first secure tunnel being associated with the client site, transmit the conversational trading data and the trading ticket data to the client site via the first secure tunnel in the publish and subscribe protocol according to the first encryption, and based on the identifier for the second secure tunnel being associated with the client site, transmit the user interface component data to the client site via the second secure tunnel in the request and response protocol according to the second encryption.

17. The system of claim 16, wherein the user interface component data comprises static web pages and active media for presentation at the first station.

18. A method, comprising:

receiving, from a server, first data that is formatted in a publish and subscribe protocol, is intended for a client site, and comprises conversational trading data associated with dialogue between users at the client site and another client site and trading ticket data for confirmed trades between the client site and the another client site;

receiving, from the client site, a request for user interface components;

receiving, from the server, a second data that is formatted in a request and response protocol, is intended for the client site, and comprises the user interface components;

establishing a first secure tunnel with a first encryption to a client site server that is in communication with one or more client stations, wherein the client site server and the one or more client stations are resident at the client site, associating an identifier for the first secure tunnel with the client site, establishing a second secure tunnel with a second encryption to a first station of the one or more client stations, associating an identifier for the second secure tunnel with the client site, based on the identifier for the first secure tunnel being associated with the client site and responsive to a determination that the first data is intended for the client site and is formatted in the publish and subscribe protocol, transmitting the first data to the client site via the first secure tunnel according to the first encryption, and based on the identifier for the second secure tunnel being associated with the client site and responsive to a determination that the second data is intended for the client site and is formatted in the request and response protocol, transmitting the second data to the client site via the second secure tunnel according to the second encryption.

19. The method of claim 18, wherein the user interface components comprise static hypermedia content and active hypermedia content for presentation at the first station.

20. The method of claim 18, wherein the first data comprises incoming call indicators and outgoing call requests associated with real-time trading between the client site and the another client site.

\* \* \* \* \*